United States Patent
Rohrbaugh

(10) Patent No.: US 10,774,488 B2
(45) Date of Patent: *Sep. 15, 2020

(54) VEHICLE WITH INTERNAL AND/OR EXTERNAL MONITORING

(71) Applicant: Federal Signal Corporation, Oak Brook, IL (US)

(72) Inventor: Scott Thomas Rohrbaugh, Clarendon Hills, IL (US)

(73) Assignee: Federal Signal Corporation, Oak Brook, IL (US)

( * ) Notice: Subject to any disclaimer, the term of this patent is extended or adjusted under 35 U.S.C. 154(b) by 313 days.

This patent is subject to a terminal disclaimer.

(21) Appl. No.: 15/877,686

(22) Filed: Jan. 23, 2018

(65) Prior Publication Data

US 2018/0148900 A1 May 31, 2018

Related U.S. Application Data

(63) Continuation-in-part of application No. 14/969,830, filed on Dec. 15, 2015, now Pat. No. 10,329,723.

(Continued)

(51) Int. Cl.
*E01H 1/02* (2006.01)
*E01H 3/02* (2006.01)
(Continued)

(52) U.S. Cl.
CPC .............. *E01H 1/103* (2013.01); *B60P 3/228* (2013.01); *E01H 1/00* (2013.01); *E01H 1/02* (2013.01);
(Continued)

(58) Field of Classification Search
CPC .. E01H 1/00; E01H 1/02; E01H 1/053; E01H 1/08; E01H 1/0818; E01H 3/00; E01H 3/02; B60P 3/228; G01B 11/30; G01F 15/06

See application file for complete search history.

(56) References Cited

U.S. PATENT DOCUMENTS 7,746,794 B2   6/2010   Sink
9,002,665 B2 * 4/2015   Karnad ..................... G01F 1/66
                                                                702/48

(Continued)

FOREIGN PATENT DOCUMENTS

RU        2 373 325 C1   11/2009

OTHER PUBLICATIONS

F. Amato et al., "A review on the effectiveness of street sweeping, washing and dust suppressants as urban PM control methods," Science of the Total Environment, vol. 408, No. 16, May 21, 2010, 16 pages.

(Continued)

*Primary Examiner* — Randall E Chin
(74) *Attorney, Agent, or Firm* — Merchant & Gould P.C.

(57) ABSTRACT

A street sweeper configured to clean a street can include: at least one broom or sprayer configured to clean a street, a street surface deviation detection device coupled to the street sweeper, the street surface deviation detection device being configured to detect visual signatures of defects in a surface of the street; and a position device to measure the position of the street sweeper, wherein the position device is programmed to send the position to a central server.

20 Claims, 7 Drawing Sheets

Related U.S. Application Data

(60) Provisional application No. 62/093,735, filed on Dec. 18, 2014.

(51) Int. Cl.
| | |
|---|---|
| *G01B 11/30* | (2006.01) |
| *G01F 15/06* | (2006.01) |
| *E01H 1/10* | (2006.01) |
| *G05D 1/02* | (2020.01) |
| *G06K 9/00* | (2006.01) |
| *E01H 1/00* | (2006.01) |
| *E01H 1/05* | (2006.01) |
| *E01H 3/00* | (2006.01) |
| *E01H 1/08* | (2006.01) |
| *B60P 3/22* | (2006.01) |
| *G01F 15/075* | (2006.01) |
| *H04Q 9/00* | (2006.01) |

(52) U.S. Cl.
CPC .............. *E01H 1/053* (2013.01); *E01H 1/08* (2013.01); *E01H 1/0818* (2013.01); *E01H 3/00* (2013.01); *E01H 3/02* (2013.01); *G01B 11/30* (2013.01); *G01B 11/306* (2013.01); *G01F 15/06* (2013.01); *G05D 1/0246* (2013.01); *G06K 9/00791* (2013.01); *G01F 15/063* (2013.01); *G01F 15/0755* (2013.01); *G05D 2201/0203* (2013.01); *H04Q 9/00* (2013.01); *H04Q 2209/40* (2013.01)

(56) References Cited

U.S. PATENT DOCUMENTS

| | | |
|---|---|---|
| 2007/0021944 A1 | 1/2007 | Levy |
| 2012/0280836 A1 | 11/2012 | Roesner |
| 2013/0057686 A1 | 3/2013 | Genc et al. |
| 2016/0177524 A1 | 6/2016 | Rohrbaugh |

OTHER PUBLICATIONS

Clem Brown et al., "Street Sweeping Pilot Studies," http://www.sandiego.gov/thinkblue/pdf/swdsweeparticle.pdf, Feb. 20, 2013, 4 pages.
RPLidar Laser Scanner on Sale, Apr. 4, 2014, 9 pages, http://www.robopeak.com/blog/?p=523.
International Search Report and Written Opinion in PCT/US2015/066128, dated Mar. 1, 2016, 13 pages.
Schmidt, Benjamin, RoadBotics, "How does it work?", Oct. 12, 2017, 2 pages.
RoadBotics, Inc., RoadBotics Technology, www.roadbotics.com/technology, copyright 2017, 3 pages.
RoadBotics, Inc., Product Features, www.roadbotics.com/features, copyright 2017, 3 pages.

\* cited by examiner

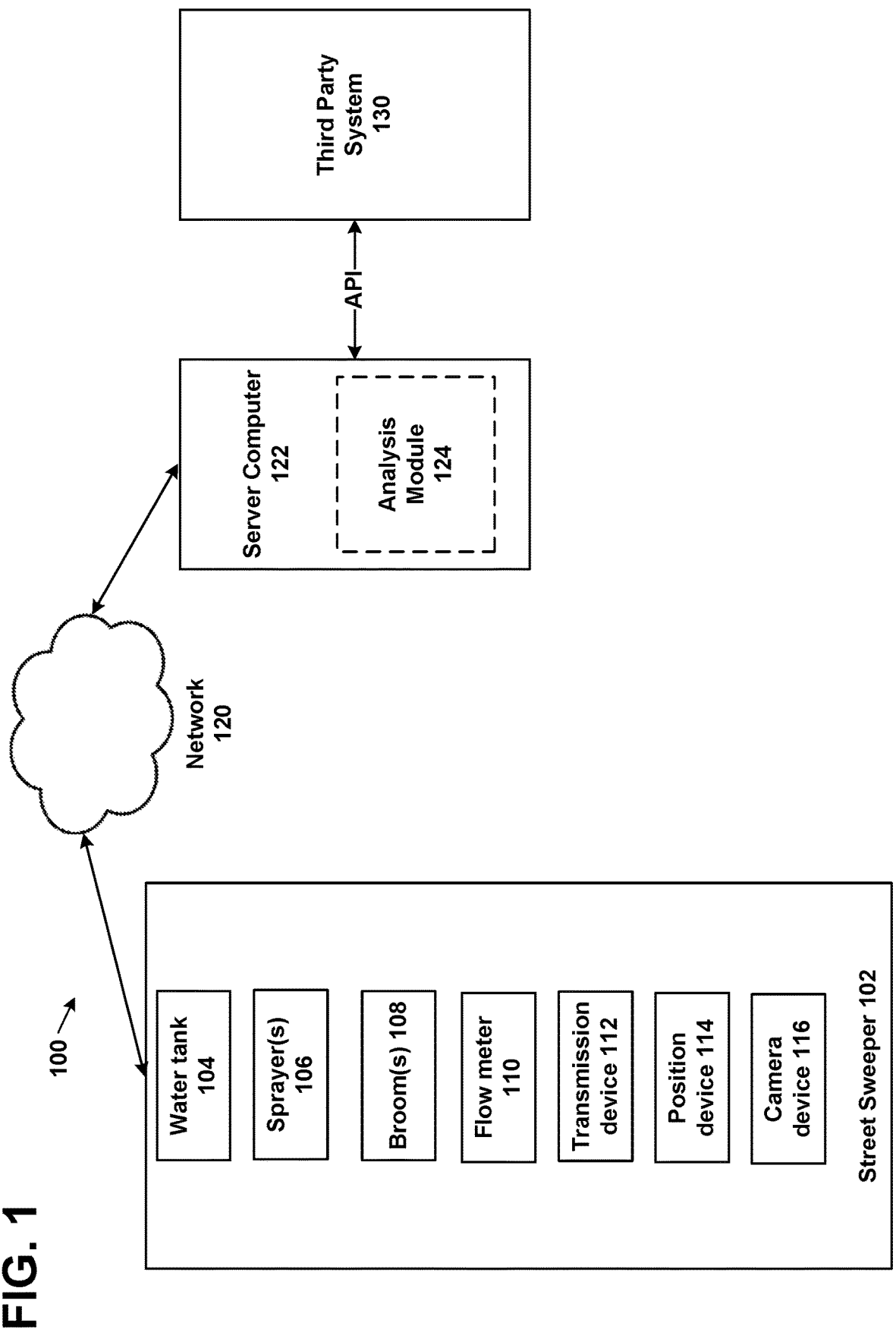

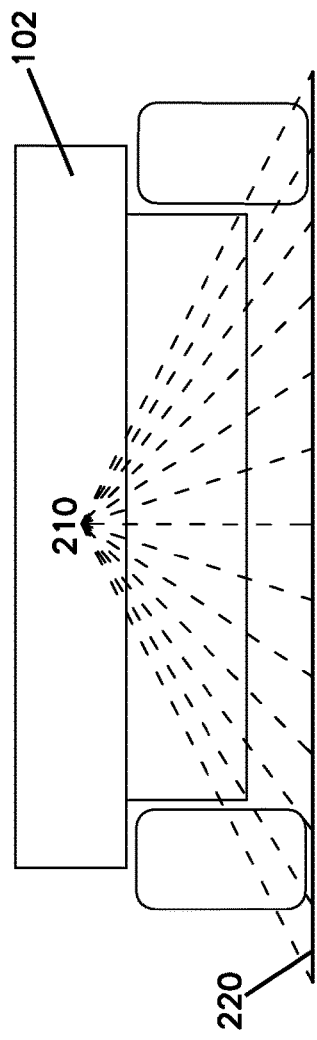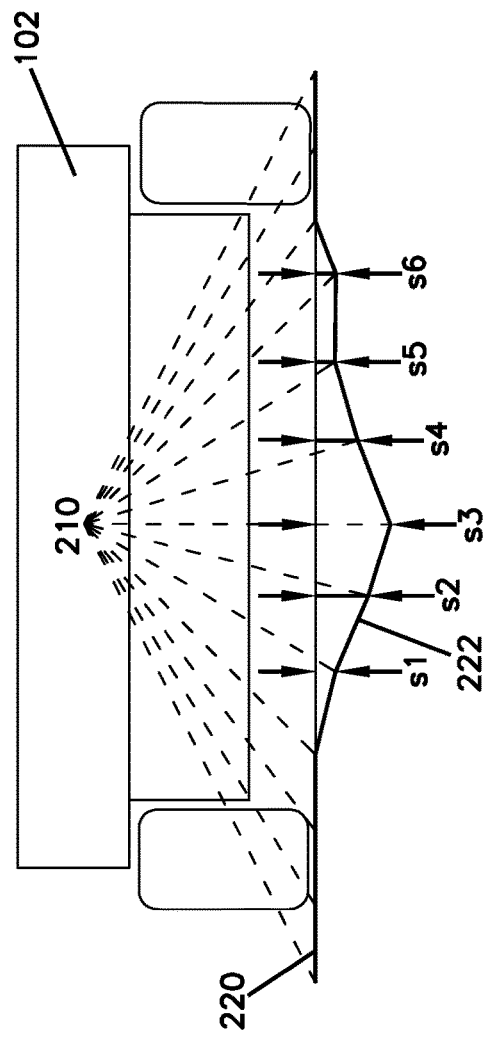

VEHICLE WITH INTERNAL AND/OR EXTERNAL MONITORING

RELATED APPLICATION(S)

This patent application is related to U.S. Patent Application Ser. No. 62/093,735 filed on Dec. 18, 2014 and U.S. patent application Ser. No. 14/969,830 filed on Dec. 15, 2015, now U.S. Pat. No. 10,329,723, the entireties of which are hereby incorporated by reference.

BACKGROUND

Municipal vehicles are dispatched daily in cities to perform various tasks on the road. For example, police and fire vehicles provide public protection services. Other vehicles, such as street sweepers and snow plows, clean the roadways. These resources are costly and limited in nature.

SUMMARY

In one aspect, a street sweeper includes: at least one broom or sprayer configured to clean a street, and a meter module to detect a consumption of water by the street sweeper at one or more locations; wherein the meter module is programmed to quantify an amount of water used by the street sweeper and to send the amount of water and the one or more locations to a central server.

In another aspect, a system includes: a street sweeper configured to clean a street, the street sweeper including a meter module to detect a consumption of water by the street sweeper, wherein the meter module is programmed to quantify an amount of water used by the street sweeper and to send the amount of water and position information to a central server; and the central server programmed to receive the amount of water.

In another aspect, a system includes: a street sweeper configured to clean a street, the street sweeper including a meter module to detect a consumption of water by the street sweeper, wherein the meter module is programmed to quantify an amount of water used by the street sweeper and to send the amount of water to a central server; and the central server programmed to receive the amount of water.

In another aspect, a system includes: a street sweeper configured to clean a street, the street sweeper including a meter module to detect a consumption of water by the street sweeper, wherein the meter module is programmed to quantify an amount of water used by the street sweeper and to send the amount of water to a central server; and the central server programmed to receive the amount of water; and a position device to measure the position of the street sweeper, wherein the position device is programmed to send the sweeper position and time of position measurement to a central server, and the central server programmed to receive the sweeper position and measurement time and to calculate speed of the sweeper.

In another aspect, a system includes: a street sweeper configured to clean a street, the street sweeper including: a meter module to detect a consumption of water by the street sweeper, wherein the position device is programmed to quantify an amount of water used by the street sweeper and to send the amount of water to a central server; and a street surface deviation detection device coupled to the street sweeper, the street surface deviation detection device being configured to collect data on a profile of the street and send the data to the central server; and a position device to measure the position of the street sweeper, wherein the position device is programmed to send the sweeper position and time of position measurement to a central server, and the central server programmed to receive the sweeper position and measurement time and to calculate speed of the sweeper and the location of changes in a surface of the street.

In another example, a system includes a street sweeper configured to clean a street, and a street surface deviation detection device coupled to the street sweeper, the street surface deviation detection device being configured to collect data on a profile of the street; and a position device to measure the position of the street sweeper, wherein the position device is programmed to send the sweeper position to a remote server; and the remote server programmed to receive the sweeper position and to calculate the location of changes in a surface of the street. The street surface deviation detection device can be a scanning laser rangefinder, a camera, or similar device.

In yet another example, a system includes a street sweeper configured to clean a street, and a street surface deviation detection device coupled to the street sweeper, the street surface deviation detection device being configured to detect visual signatures of defects in a surface of the street; and a position device to measure the position of the street sweeper, wherein the position device is programmed to send the sweeper position to a central server; and the central server programmed to receive the sweeper position and to calculate the location of changes in a surface of the street. The street surface deviation detection device can be a visual (e.g., still or motion/video) or infrared camera or similar device.

DESCRIPTION OF THE DRAWINGS

FIG. 1 is a schematic view of an example system for measuring aspects of a vehicle and/or an environment in which the vehicle is positioned.

FIG. 2 is a schematic view of an example street sweeper with a street surface deviation detection device.

FIG. 3 is another schematic view of an example street sweeper of FIG. 2.

DETAILED DESCRIPTION

Figure 4:
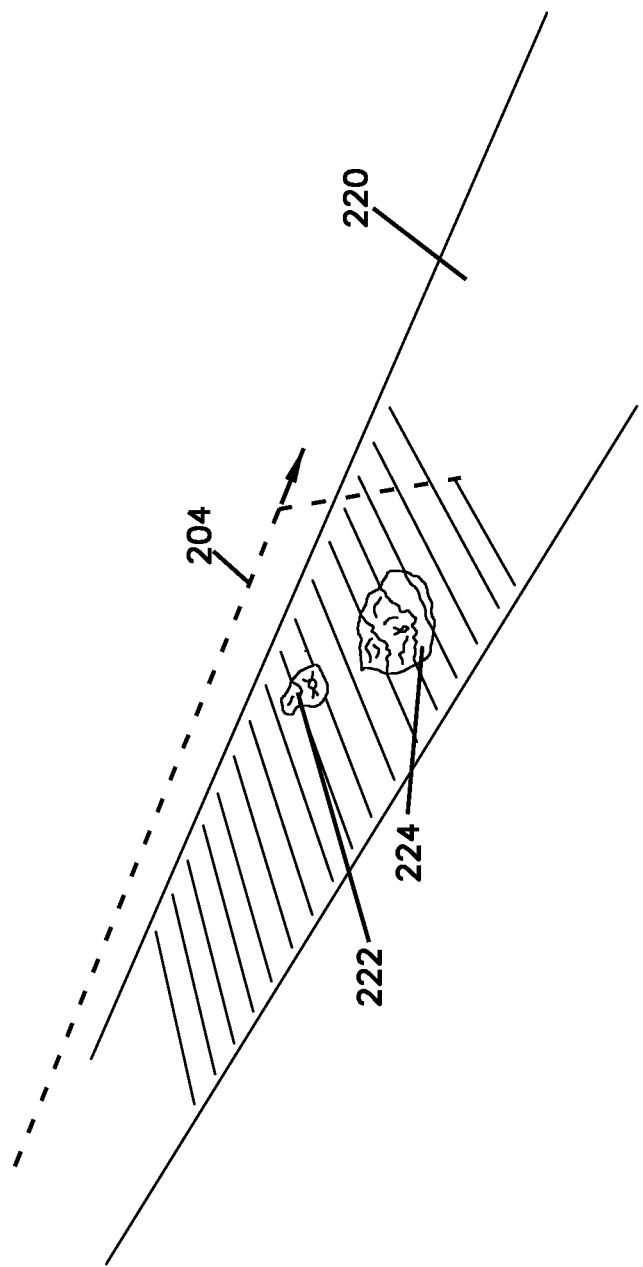
FIG. 4 is a schematic view of an example street with surface deviations therein.
Figure 5:
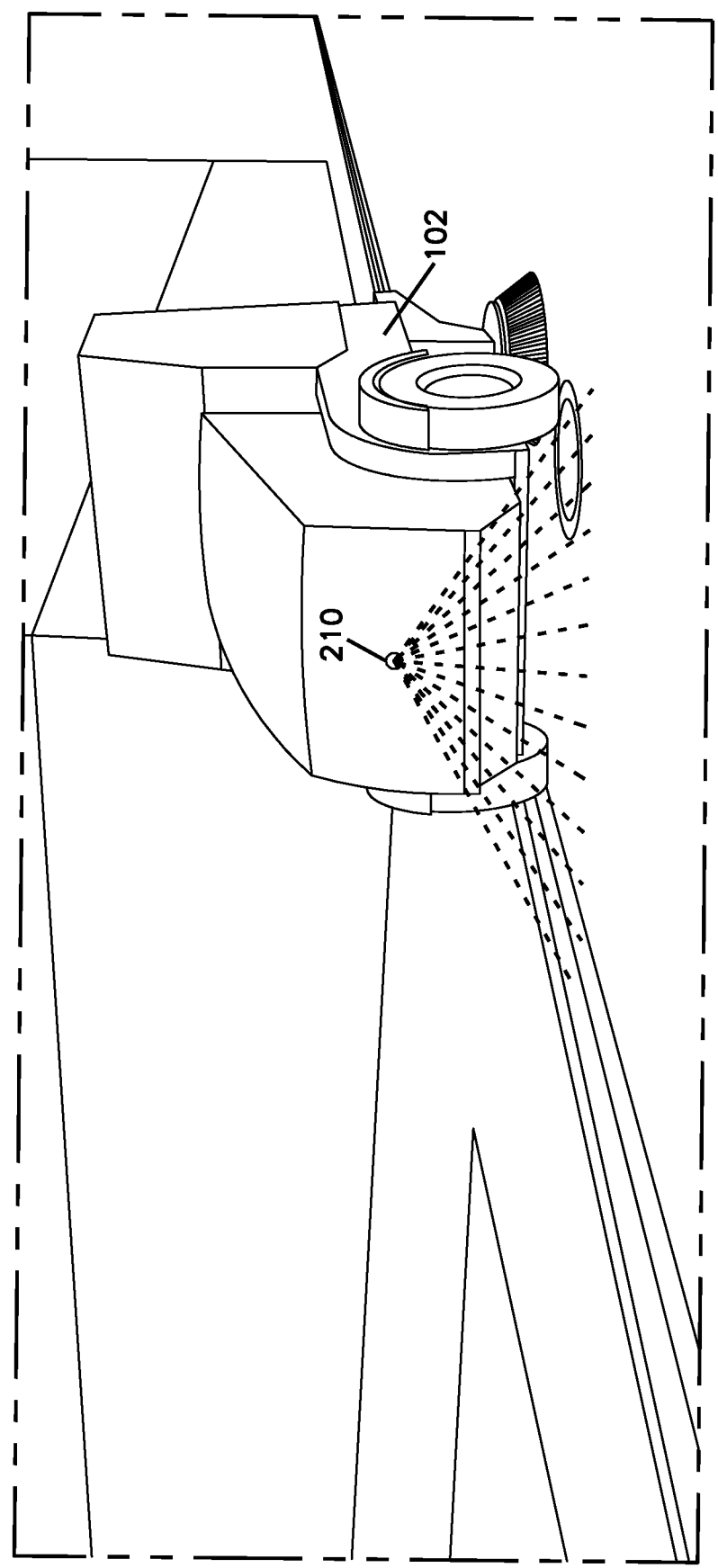
FIG. 5 is an example street sweeper with an example surface deviation detection device.

Examples provided herein relate to municipal vehicles, such as police and fire vehicles, street sweepers, sewer cleaners, snow plows, etc. These municipal vehicles include sensing systems that are configured to monitor both internal attributes (i.e., attributes related to the vehicles themselves) as well as external attributes (i.e., attributes related to the environment surrounding the vehicles).

In one example, a vehicle such as a street sweeper is configured to monitor and report various attributes associated with the street sweeper's operation, such as water consumption. In another example, a street sweeper is combined with a street surface deviation detection device, such as a scanning laser rangefinder, to detect, identify, locate and/or measure potholes and other deviations in a road surface. Other configurations are possible, as described herein.

Referring now to FIG. 1, in an example system 100, a street sweeper 102 (sometimes referred to as a street cleaner) is a vehicle that is driven along roadways to clean the roadways. Street sweepers can use a combination of sweeping devices and/or vacuum devices to clean the roadways. Street sweepers typically include water tank(s) 104 and sprayer(s) 106 used to loosen particles and reduce dust. Broom(s) 108 gather debris into a main collection area from which it is vacuumed and pumped into a collection bin or hopper. Other configurations, such as air by centrifugal separation, can be used. Such street sweepers are referred to as regenerative air street sweepers.

In this example, the street sweeper 102 is configured with a water flow meter 110 (and/or other sensors) connected to a transmission device 112. In general, the transmission device 112 communicates with the water flow meter 110 to estimate water consumption of the street sweeper 102.

The transmission device 112 thereupon transmits, in near real-time or in batch, water consumption information and other information associated with the operation of the street sweeper 102 (such as location of the street sweeper or other vehicle or pot hole detection described below) through a network 120 (e.g., cellular network, Wi-Fi over LAN, WAN, etc.) to a server computing device 122. One non-limiting example of such a transmission device is the ConnectPort X5 manufactured by Digi International of Minnetonka, Minn. Other configurations are possible.

A position device 114 is also included in the street sweeper 102. The position device 114 is a global positioning system or other device that can locate the position of the street sweeper 102. In some examples, the position device 114 is used to measure the position of the street sweeper 102, wherein the position device 114 is programmed to send the sweeper position and time of position measurement to the transmission device 112 for forwarding to the server computing device 122, whereupon the server computing device 122 is programmed to receive the sweeper position and measurement time and to calculate speed of the sweeper.

The server computing device 122 aggregates the information from the street sweeper 102 and other vehicles providing similar information. The server computing device 122 includes an analysis module 124 that analyzes the information and provides various information. For example, the analysis module 124 can be programmed to provide a map of the route taken by the street sweeper 102 and indicate water usage along the route as a function of the position of the street sweeper 102. In some examples, the analysis module 124 monitors the function of the street sweeper 102 and provides alerting and other information. For example, the analysis module 124 can monitor water consumption and provide alerts (e.g., visual on the map or via SMS, email, telephone, etc.) if water consumption of the street sweeper 102 exceeds a threshold. This monitoring can be accomplished for one or more street sweepers (e.g., such as for a fleet of street sweepers deployed by a municipality).

Examples of water flow alerts include the following:
Flow rate exceeds maximum design rate—The maximum flow rate of the water system is ultimately controlled by the nozzles in the system. Exceeding the maximum design flow rate (plus some delta to account from normal nozzle orifice wear) in an indication of a leak in the system, excessive wear of nozzle orifices, replacement nozzles that are not correct, or one or more nozzles is missing from the system.

Flow rate>0 when ground speed is =0 for longer than 15 seconds—This is an indication that the water system has not been shut off when the sweeper is sitting still for some reason. Reasons can include, awaiting a stop light, waiting to cross a street, an intersection, operator exiting the sweeper to inspect something or to remove large obstacles from the sweeper's path, refilling with water, etc.

Flow rate>0 when ground speed is >15 mph for more than 15 seconds—This is an indication that the operator is traveling in road mode and is not sweeping. The time delay will allow the operator to accelerate through an intersection or around parked vehicles, etc.

Flow rate=0 while the vehicle is traveling between 1 and 15 mph—This would be an indication that the operator is not using water to suppress dust emissions while sweeping. This condition is also related to traffic safety, air quality, and wear of major sweeper components.

Water use>0 during rain events—The need to utilize water for dust suppression while it is raining is minimized. Understandably, this requires linkage to some other data source that is specific enough to inform when and where in the City it is currently raining, or has rained recently (within the past 15 minutes) to some level (>0.x inches).

Total water consumption between re-fills exceeds x minutes—This is an indication of the sweeper's capacity to sweep productively. This would indicate that there is a leak in the reservoir of the water system, the system was not completely filled, or the operation is interrupted more frequently than normal. The normal condition would have to omit periods of regularly scheduled breaks. This can be calculated using the reservoir's capacity, knowledge of the maximum flow rates and the time the system is on (or water is flowing). It would require a reset of the measurement period after a refill, which can be assumed to be a period of 10 minutes of flow=0 and vehicle speed=0 outside of the regularly scheduled breaks.

These are just some of the example metrics that could be used. Additional metrics can also be monitored and/or reported as desired.

Further, some or all of the analytics could be performed by the street sweeper 102. For example, the street sweeper 102 can include one or more computing devices that are programmed to perform some or all of the functionality of the analysis module 124. In such a configuration, the analysis from the analysis module 124 can be displayed to the operator of the street sweeper 102 in real time and/or can be transmitted to the server computer 122 for storage, display, and/or further manipulation.

In addition to reporting water consumption, the transmission device 112 can monitor other functional aspects of the street sweeper 102 and report these to the server computing device 122. Examples of these aspects include:
position of the street sweeper or other vehicle (e.g., using GPS)—see position device 114;
and/or functioning of the particulate trap;
position and/or functioning of the broom;
function of the motor (e.g., transmission temperature, fuel consumption, etc.)

In addition, as the data is accumulated and transmitted, various metrics can be calculated, such as:
Averages can be calculated to indicate changes in sweeping program effectiveness (by shift, by day, by week, by sweeper, by season, etc.).

Sweeping productivity—Total distance swept with water (water flow is an indication of sweeping mode, assuming alerts noted are not triggered).

Top x areas with greatest water consumption in the shortest distance swept—This is an indication of problem areas that may need to be swept more frequently. If GPS location is integrated, it could show where operators sweep multiple passes (large accumulations) or multiple times per shift (poor route planning).

Route comparisons—Assuming planned routes, the consistency of performance on these routes can be compared.

Finally, the street sweeper or other vehicle can be configured to monitor a variety of other aspects, both internal to the vehicle and/or external to the vehicle. These aspects (or parameters) can include one or more of the following:

Data associated with the operation of the vehicle (on-vehicle data)
  Primary vehicle system data
  Primary & secondary engine health & performance
  Oil temperature
  Oil reservoir level
  Engine run time
  Engine load value & instantaneous/average RPM
  Particulate trap fill level
  Transmission temperature
  Electric motor health & performance
    Temperature
    Mechanical load
    Electrical impedance
  Chassis health & performance
    Geographic Position & route traveled
    Vehicle speed and acceleration
    Brake thickness
    Braking effectiveness (brake force relative to brake depression)
    Regenerative braking effectiveness
    Accumulated shock data
    Vehicle weight
Data from auxiliary vehicle systems (auxiliary vehicle system data)—such as tools and implements intended to interact with the vehicle's environment, and engines, motors, pumps and other components intended to support those tools and implements
  Water deposition rate
    Dust suppression
    Street washing
    Sewer cleaning
    Hydroexcavation
    Accumulated water dispensed
  Sweeper broom erosion
  Sweeper broom position
  Debris body/waste hopper fill level
  Water tank level
  Hydraulic reservoir level
Data associated with the environment surrounding the vehicle (off-vehicle data)
  Road profile data (see below)
  Road defect shape and location data
  Road surface imagery
  Road signage condition visual data
  Curb condition visual data
  Air quality data
    Atmospheric and/or sewer gas concentration
      Methane
      $CO_2$
      CO
      $O_3$
      NO
      NO2
      Etc.
    Humidity
    Dust particle concentration
  License Plate Recognition Data—sometimes referred to as automated license plate recognition (APLR); one example of such a system is described in U.S. Patent Published Application No. 2012/0280836 to Roesner, which is hereby incorporated by reference in its entirety
  Facial recognition data
  Road surface temperature
  Sewer fill level
  Sewer fluid flow rate
  Sewer line length cleaned (for sewer cleaners & sweepers capable of sewer cleaning)
  Mass of material contained in debris body/waste hopper Other aspects can also be reported. The list provided above is not meant to be exhaustive no limiting.

Referring now to FIGS. 2-5, by equipping the street sweeper 102 with a surface deviation detection device 210, such as a scanning laser rangefinder, the street sweeper 102 becomes capable of measuring the profile of a swath of road or street 220 on which it drives in a direction of travel 204. By analyzing those road profile measurements, it becomes possible to algorithmically identify the location of potholes, cracks, buckles, and other deviations from flatness in the road surface, such as deviations 222, 224, shown in FIGS. 3-4.

In this example, the surface deviation detection device 210 measures the distance between itself and a series of points arranged in a plane around the unit at small azimuthal intervals. When installed on the front of the street sweeper 102 in an orientation placing the measurement plane roughly perpendicular to the sweeper's direction of travel 204, the surface deviation detection device 210 serves to measure the distance between its location on the vehicle and a series of locations on the road surface.

By measuring the distance between the surface deviation detection device 210 and the road surface as a function of azimuthal angle, it is possible to identify locations in the road that deviate from a flat profile. By collecting multiple road profiles as a function of distance traveled along the road, profile deviations from a flat line can be combined into volumetric deviations from a flat surface and assessed as either bumps on the road or holes in the road; information such as deviation volume, peak amplitude, or abruptness may be used to identify potholes in need of later maintenance. Similarly, individual profiles may be used as machine control inputs used to raise or lower machine components (such as a sweeper head) in order to properly interface with the road surface.

For example, as shown in FIG. 3, non-flat road surfaces s1 through s6 indicate additional distance from laser source to surface that would not be measured for a flat road surface. An analysis of this information can be used to identify road abnormalities, such as pot holes, etc.

Such information can be reported to the transmission device 112 on the street sweeper 102 to the server computing device 122. This information can be used by the analysis module 124 to determine a condition of the road. For example, the analysis module can identify abnormalities, such as pot holes, that can be used to dispatch crews to address them.

Figure 7:
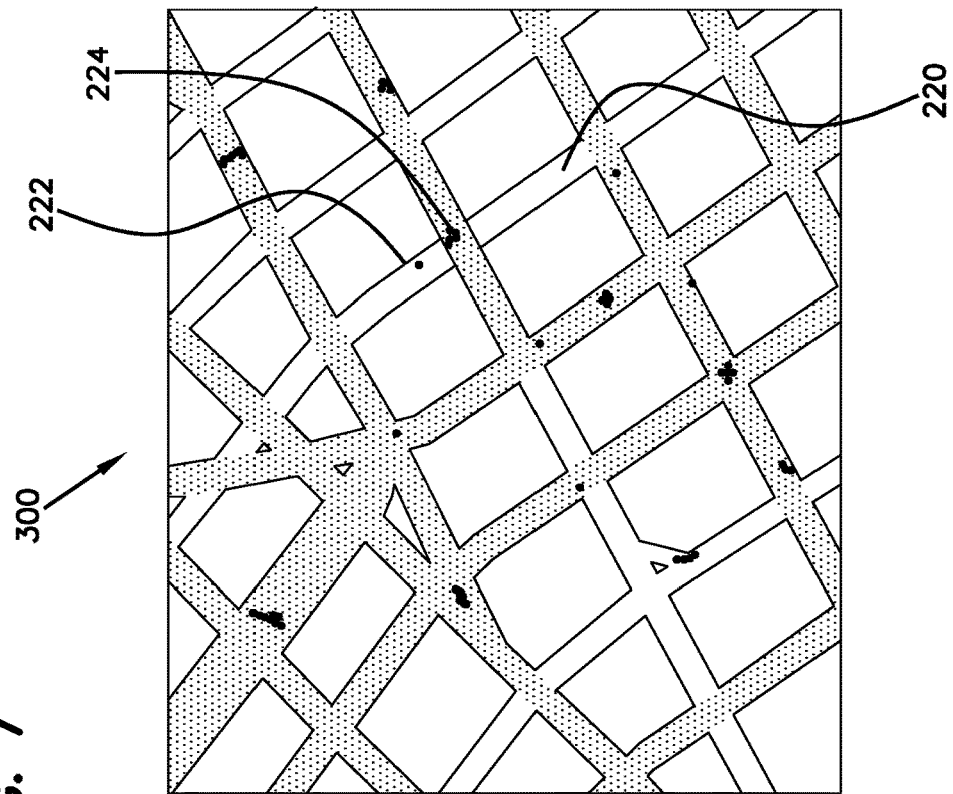
FIG. 7 is the map of FIG. 6 including a plurality of deviations depicted thereon.
Figure 6:
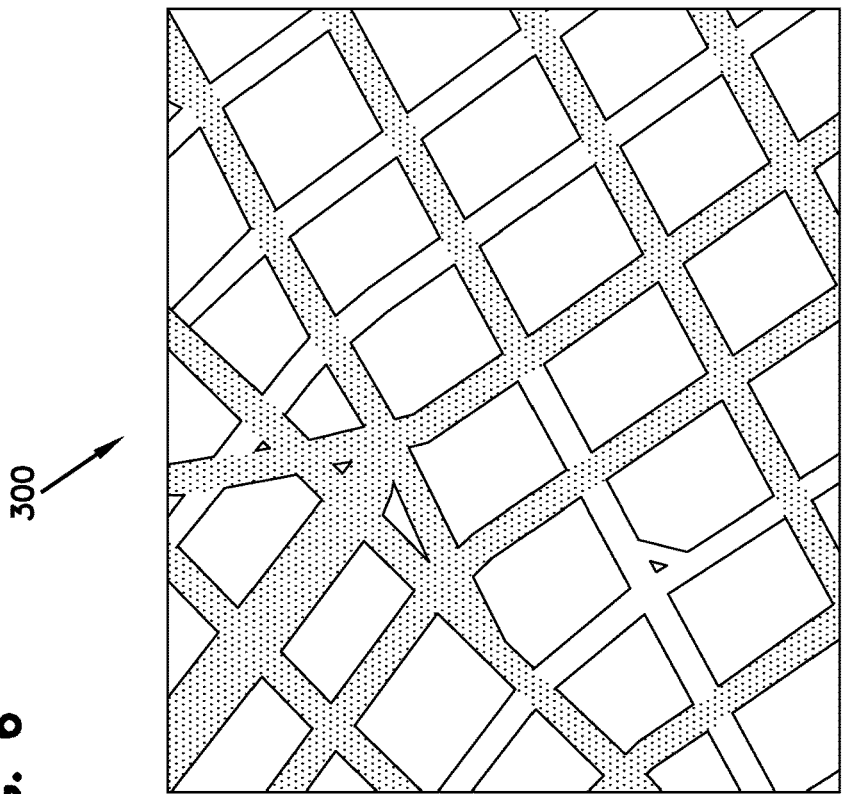
FIG. 6 is an example map depicting a plurality of streets.

For example, FIGS. 6-7 illustrate an example map 300 generated by the server computing device 122. In FIG. 6, the map 300 has no active road profile measurement program depicted. In FIG. 7, the map 300 has an active road profile measurement program. The notational deviations (e.g., deviations 222, 224 on the street 220, such as pot holes) are overlaid onto the depicted roads, with color-indications provided. For example, red indicates notional deviations below road profile grade, while blue indicates notional deviations above road profile grade. Other configurations are possible.

Figure 8:
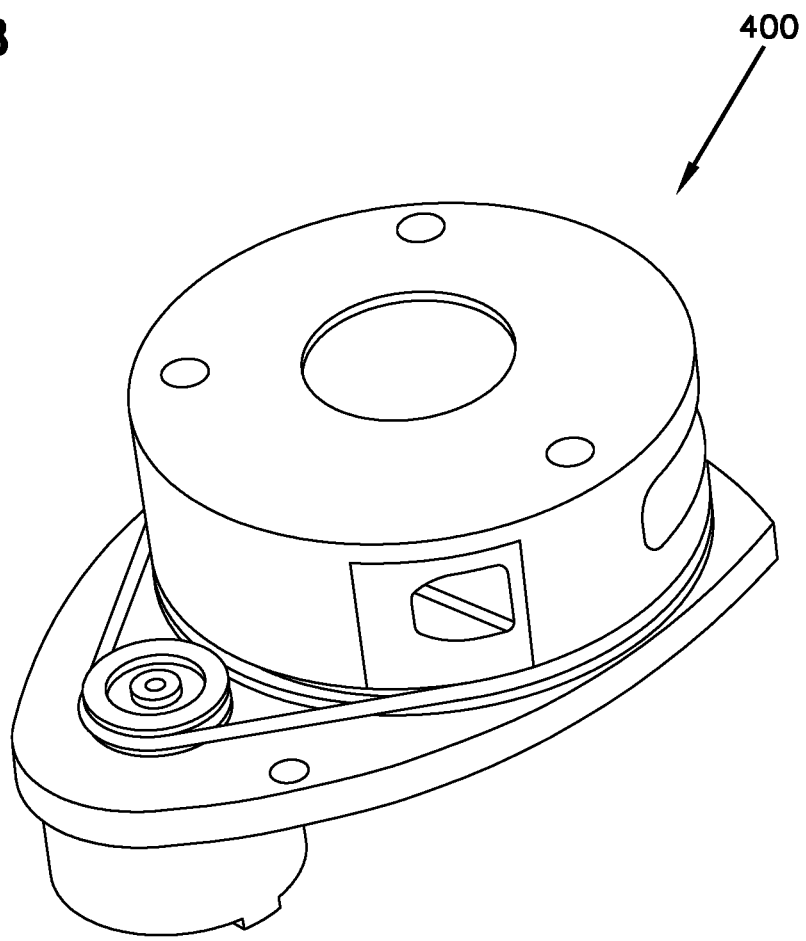
FIG. 8 is an example LIDAR device.

In some examples, a LIDAR (a portmanteau of "light" and "radar") device 400 is used as the surface deviation detection device 210. One example of such a LIDAR device is a hobby-scale LIDAR unit from RoboPeak (http://www.robopeak.com/blog/?p=523) (Cost=about $400), an example of which is depicted in FIG. 8. Other configurations and devices may be used.

In some examples, a camera device 116 (see FIG. 1) is used as the surface deviation detection device 210. In such an example, the camera device 116 can be used to capture a visual depiction of the road, either in still images and/or video. The captured images and/or video can be used to identify and/or assess any surface deviations.

In one example, the camera can captures one or more images and/or video as the street sweeper moves along a route. The images and/or video can be automatically or manually reviewed to identify relevant surface deviations. In some instances, the images and/or video can be analyzed by one or more computing devices to automatically identify the deviations and/or flag possible deviations for manual review. In other instances, the images and/or video can be delivered to one or more technicians for review and identification of the deviations.

In another example, the camera can be used in conjunction with other surface deviation detection device, such as the LIDAR device 400. In this example, the data from the LIDAR device 400 can be used to identify a possible surface deviation. Once identified, the camera can be configured to capture one or more images and/or video of the possible surface deviation for later review and analysis. The camera can, for example, be automatically triggered once the LIDAR device 400 identifies the possible surface deviation, and the images and/or video captured by the camera can be used for deciding how best to address the deviation.

In some examples, the device can be a camera that captures images and/or video. In other examples, the can be a camera that captures infrared or other types of images or video. Other configurations and devices may be used.

As noted, the server computing device 122 is a computing device that is used to capture and/or manipulate the data obtained by the scanning laser rangefinder. In such an example, the computing device can store the data, manipulate the data and/or present the data (see, e.g., FIGS. 5-6).

In other examples, a still-image or video camera is used as the surface deviation detection device 210. Other configurations and devices may be used.

The example computing device includes at least one central processing unit ("CPU" or processor), system memory, and input/output devices such as a mouse, display, etc. The computing device further includes a mass storage device that is programmed to store software instructions and data.

The mass storage device and its associated computer-readable data storage media provide non-volatile, non-transitory storage for the computing device. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device.

The computing device may operate in a networked environment using logical connections to remote network devices through a network, such as a wireless network, the Internet, or another type of network. As mentioned briefly above, the mass storage device can store software instructions and data. The software instructions include an operating system suitable for controlling the operation of the computing device. The mass storage device and/or the RAM also store software instructions, that when executed by the CPU, cause the computing device to provide the functionality of the systems and methods discussed in this document. For example, the mass storage device and/or the RAM can store software instructions that, when executed by the CPU, cause the computing device to store the data, manipulate the data, and/or present the data.

Measurements may include surface profile data (collected by the LIDAR unit), three-dimensional position data (determined from GPS-derived position data or another method) to provide location information, and a heading measurement (determined from a compass or another method) to provide orientation information. The computing device may associate the data from all three sources and store that data as a single measurement.

Following each measurement, or following a series of associated measurements, the computing device may combine surface profile data, positioning data, and heading data to construct a digital re-creation of the road surface.

Following digital re-creation of the road surface, the computing device may manipulate road profile measurement data via mathematical analysis for flatness, either as single profile measurements or in groups of profile measurements. Road flatness deviations may be identified as surface points or groups of surface points that deviate significantly from the position of their neighbors, by sets of surface points calculated to exhibit excessive curvature, or other characteristics that may be calculated by the computing device.

The computing device may identify the location of potholes or other road surface damage in single or grouped profile measurements by visualizing the positions of excessive flatness deviations in the surface profile data.

Figure 9:
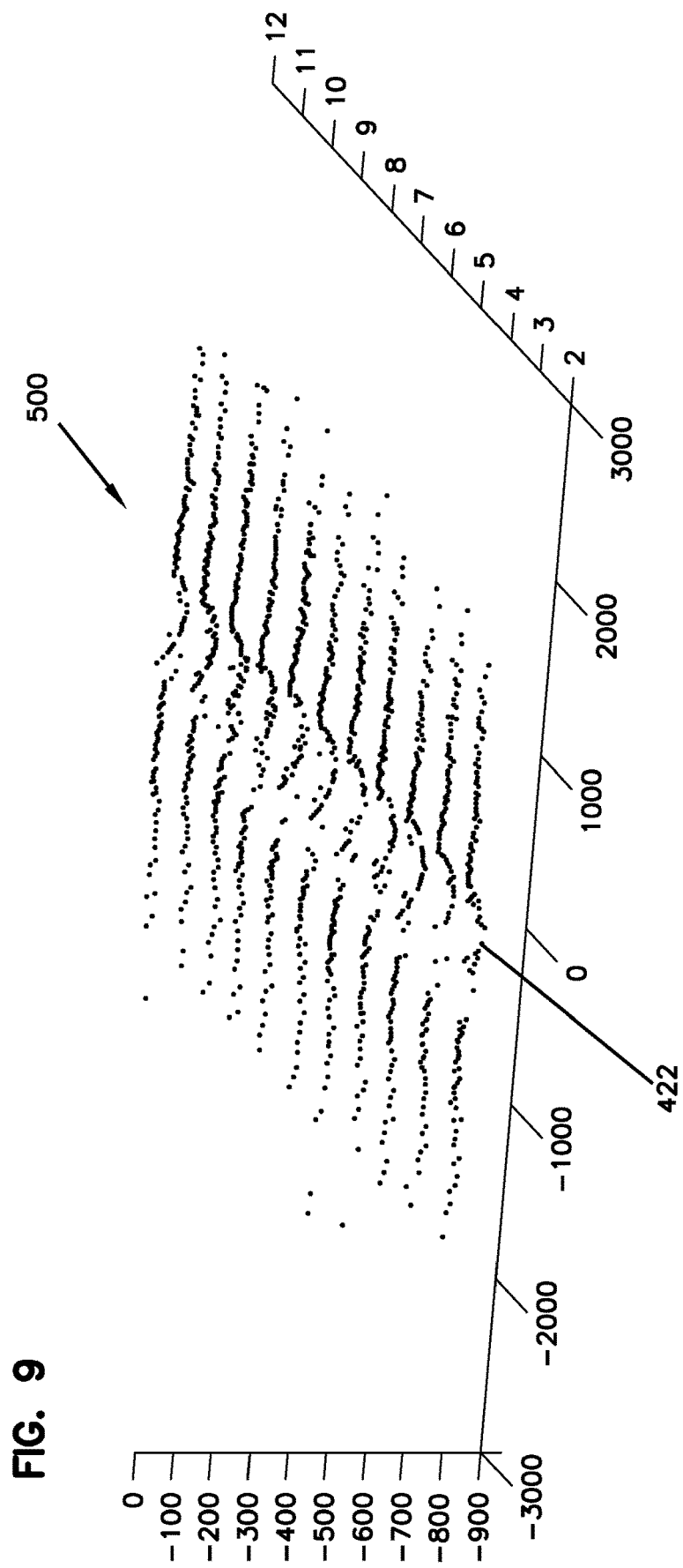
FIG. 9 is a plot depicting a plurality of measurements taken by the street surface deviation detection device.

For example, referring now to FIG. 9, a 22 inch scan of a one inch gouge in pavement is depicted on plot 500. On plot 500, the x-axis depicts distance along the road and the y-axis depicts the height of the road. The plot 500 includes a plurality of measurements taken by the surface deviation detection device 210. The plot 500 clearly depicts a deviation 422 in the road surface.

In some examples, the analysis module 124 is configured to depict the metrics that are received and analyzed as part of a comprehensive or integrated municipal management console, such as that disclosed in U.S. Pat. No. 7,746,794 to Sink, the entirety of which is hereby incorporated by reference. In a similar example, the analysis module 124 is configured to be used as part of the Commander Plus system offered by Federal Signal Corporation of Oakbrook, Ill.

In an alternate configuration, measurements may include still or video imagery (collected by the camera), three-dimensional position data (determined from GPS-derived position data or another method) to provide location information, and a heading measurement (determined from a compass or another method) to provide orientation information. The computing device may associate the data from all three sources and store that data as a single measurement.

Following collection of still or video imagery data, the computing device may analyze the imagery for visual signatures of defects in the road surface (such as cracks, holes, pits, hills, patches, temporary material fills, faded or broken lane markings, etc.). The computing device may also be configured to analyze the imagery for other visual signatures that are not strictly part of the road surface material (such as debris on the road, graffiti on structures near the road, foliage incursion into the road). The computing device may calculate the extent of any detected signatures, associate that calculated extent with position and orientation data of the defect, and store that data as a single measurement. The computing device may also associate road defect data with still imagery data representing the defect.

Further, the analysis performed by the analysis module 124 and metrics and information from the system 100 can be provided as an input to one or more third party systems. For example, the system 100 can be used to interface with a third party system 130, such as a separate management console. An application programming interface, or API, can be provided by the server computing device 122 to allow the third party system 130 to access certain of the information from the server computing device 122 and analysis modules 124, such as water consumption metrics.

What is claimed is:

1. A street sweeper configured to clean a street, the street sweeper comprising:
   at least one broom or sprayer configured to clean a street;
   a street surface deviation detection device coupled to the street sweeper, the street surface deviation detection device being configured to detect visual signatures of defects in a surface of the street; and
   a position device to measure a position of the street sweeper, wherein the position device is programmed to send the position to a central server;
   wherein the central server generates a road map that indicates positions of street surface defects on the road map based on position information provided by the position device and the detected visual signatures of defects provided by the street surface deviation detection device.

2. The street sweeper of claim 1, wherein the street surface deviation detection device is programmed to capture one or more images of the visual signatures of defects and to send the one or more images to the central server.

3. The street sweeper of claim 2, wherein the central server is programmed to calculate a location of the visual signatures of defects.

4. The street sweeper of claim 2, wherein the street surface deviation detection device is a visual camera.

5. The street sweeper of claim 2, wherein the street surface deviation detection device is an infrared camera, a still camera, or a video camera.

6. The street sweeper of claim 1, further comprising:
   a meter module to detect a consumption of water by the street sweeper;
   wherein the meter module is programmed to quantify an amount of water used by the street sweeper and to send the amount of water to the central server.

7. The street sweeper of claim 6, wherein the meter module is part of an analysis module programmed to measure a plurality of parameters associated with the street sweeper.

8. The street sweeper of claim 7, wherein the plurality of parameters includes parameters associated with operation of the street sweeper.

9. The street sweeper of claim 8, wherein the plurality of parameters includes parameters associated with an environment surrounding the street sweeper.

10. The street sweeper of claim 1, wherein the street surface deviation detection device further includes a scanning laser rangefinder.

11. A system, comprising:
    a street sweeper configured to clean a street, the street sweeper including a meter module to detect a consumption of water by the street sweeper, wherein the meter module is programmed to quantify an amount of water used by the street sweeper and to send the amount of water to a central server;
    a street surface deviation detection device coupled to the street sweeper, the street surface deviation detection device being configured to detect visual signatures of defects in a surface of the street; and
    the central server programmed to receive the amount of water.

12. The system of claim 11, wherein the street surface deviation detection device is programmed to capture one or more images of the visual signatures of defects and to send the one or more images to the central server.

13. The system of claim 12, wherein the central server is programmed to receive a sweeper position and to calculate a location of the visual signatures of defects.

14. The system of claim 12, wherein the street surface deviation detection device is a visual camera.

15. The system of claim 12, wherein the street surface deviation detection device is an infrared camera, a still camera, or a video camera.

16. The system of claim 12, wherein the meter module is part of an analysis module programmed to measure a plurality of parameters associated with the street sweeper.

17. The system of claim 16, wherein the plurality of parameters includes parameters associated with operation of the street sweeper.

18. The system of claim 16, wherein the plurality of parameters includes parameters associated with an environment surrounding the street sweeper.

19. The system of claim 12, wherein the street surface deviation detection device further includes a scanning laser rangefinder.

20. The system of claim 12, wherein the street surface deviation detection device includes a camera.

* * * * *